United States Patent [19]
McBride

[11] Patent Number: 5,327,696
[45] Date of Patent: Jul. 12, 1994

[54] CONCRETE ANCHORING DEVICE AND METHOD

[76] Inventor: Arlen P. McBride, 4591 S. Main St. Rd., New Castle, Ind. 47362

[21] Appl. No.: 832,079

[22] Filed: Feb. 6, 1992

[51] Int. Cl.⁵ ............... E04G 21/00; E21D 20/00; F16B 13/08
[52] U.S. Cl. ............... 52/745.21; 52/698; 405/259.4; 411/55
[58] Field of Search ............... 52/741.1, 698, 745.21, 52/508, 513, 712; 405/302.2, 259.1, 259.4; 411/55, 60, 61, 64, 67

[56] References Cited

U.S. PATENT DOCUMENTS

| | | | |
|---|---|---|---|
| 1,758,924 | 5/1930 | Blakeslee | 411/60 |
| 1,821,401 | 9/1931 | Peirce | 411/61 |
| 3,115,056 | 12/1963 | Teeple, Jr. | 52/698 |
| 3,172,603 | 3/1965 | Bell et al. | 52/698 |
| 3,598,013 | 8/1971 | Broberg | 52/698 |
| 3,821,511 | 8/1974 | Broberg | 52/712 |
| 4,203,193 | 5/1980 | Arthur | 411/61 |
| 4,378,180 | 3/1983 | Scott | 405/259.1 |
| 4,625,489 | 12/1986 | Bogle | 52/712 |
| 4,729,704 | 3/1988 | Yokoyama | 411/61 |
| 4,753,559 | 6/1988 | Pentesco | 411/61 |

*Primary Examiner*—Michael Safavi
*Attorney, Agent, or Firm*—Woodard, Emhardt, Naughton, Moriarty & McNett

[57] ABSTRACT

A concrete anchoring device for a standard nut or bolt, comprising: at least one pair of identical wedge-shaped members aligned in mirror image relationship with their thinnest tapered edges in juxtaposition separated by a distance Y; and adhesive tape spanning distance Y and removably adhered to a substantial portion of the top surfaces of each pair of identical wedge-shaped members; and a method of using the concrete anchoring device to anchor a standard bolt head or bolt nut within a pre-drilled hole.

3 Claims, 6 Drawing Sheets

CONCRETE ANCHORING DEVICE AND METHOD

BACKGROUND OF THE INVENTION

1. Field of the Invention

The present invention relates generally to construction materials and methods, and more particularly, is concerned with a concrete anchoring device and method of use to provide an inexpensive, and potentially recoverable, concrete anchor for a standard nut and bolt, or the like.

2. Description of the Prior Art

Existing concrete anchoring devices and methods of use include specially manufactured bolts having integrally attached anchoring devices that cooperate with the bolts to provide a substantially permanent anchoring attachment of the bolts and their anchoring devices within prepared receiving holes in the concrete. FIGS. 1 and 2 (Prior Art) illustrate two of the most common concrete anchoring devices of the prior art.

The device illustrated in FIG. 1 includes a specialty bolt 10 that is threadingly received within one end of a fitting 12 that has been furnished with a through-bore 14 that tapers down to a diameter smaller than that of the bolt 10 at its other, unthreaded end 16. At end 16 of fitting 12, the fitting has been cut into quarter sections 18. Thus, when the combined bolt 10 and fitting 12 are placed into a pre-drilled concrete hole selectively sized to be just slightly larger than the diameter of fitting 12, advancing bolt 12 into the threaded end of fitting 12 by clockwise rotation of bolt head 20 will force bolt 10 through the tapered through bore 14 toward the unthreaded end 16. This will force quarter sections 18 outwardly and into contact with the walls of the pre-drilled concrete hole. The frictional forces thus created between quarter sections 18 and the walls of the pre-drilled concrete hole anchor fitting 12, and bolt 10, within the pre-drilled concrete hole.

The device illustrated in FIG. 2 includes a specialty rod 30 that has been threaded and provided with a nut 32 at one end. At the opposite end 36, the rod has been milled to provide a conically tapered section 36 that begins at end 36 and runs toward the opposite threaded end. An expandable sleeve 38 has been fitted over the portion of the conically tapered section 36 that is closest to the threaded end of rod 30. On opposite sides of expandable sleeve 38 are a pair of integral protrusions 40 (only one shown) that protrude outwardly beyond the diameter of rod 30. When the combined rod 30 and expandable sleeve 38 are placed into a pre-drilled concrete hole selectively sized to snugly receive the protrusions 40 on expandable sleeve 38, advancing nut 32 by clockwise rotation toward end 36 of rod 30 against the concrete surface surrounding the pre-drilled concrete hole will begin forcing rod 30 out of the pre-drilled concrete hole. Expandable sleeve 38 will remain fairly stationary, however, due to the frictional forces between protrusions 40 and the pre-drilled concrete hole. As end 34 moves up the pre-drilled concrete hole, expandable sleeve 38 will be forced outwardly by the increasing diameter of the conically tapered section 36, increasing the frictional forces upon protrusions 40 until rod 30 can no longer be advanced out of the pre-drilled concrete hole. The frictional forces thus created between protrusions 40 and the walls of the pre-drilled concrete hole firmly anchor rod 40 within the pre-drilled concrete hole.

Both of the prior art devices illustrated in FIGS. 1 and 2 are relatively expensive, and their methods of use render them useful for only a single application. Also, they are not adjustable to accommodate varyingly sized pre-drilled concrete holes. A given anchor of the type illustrated in either FIG. 1 or 2 would be sized to fit only pre-drilled concrete holes of a given diameter, within limited tolerances. Furthermore, when the device of FIG. 1 had served its purpose, bolt 10 would be backed out of fitting 12, and the pre-drilled concrete hole would be filled with concrete. In the case of the device of FIG. 2, nut 32 would be backed off and the rod 30 would be driven down until it was wholly within the pre-drilled concrete hole, which are always drilled deeper than the length of the anchoring device to be used, and the pre-drilled concrete hole would be filled with concrete. In each case, the essential elements of the anchoring devices would be irretrievably lost.

SUMMARY OF THE INVENTION

The concrete anchoring device and method of the present invention provide an inexpensive, and potentially recoverable, alternative to the concrete anchoring devices and methods of the prior art, that may be utilized with any bolt desired to be used as a concrete anchor, and which also provide adjustability to accommodate a range of bolt and pre-drilled concrete hole diameters.

One embodiment of the present invention is a concrete anchoring device for a standard nut or bolt, comprising at least one pair of identical wedge-shaped members aligned in mirror image relationship with their thinnest tapered edges in juxtaposition separated by a distance Y; and adhesive tape spanning distance Y and removably adhered to a substantial portion of the top surfaces of each pair of identical wedge-shaped members.

Another embodiment of the present invention is a method of anchoring a standard bolt head within a pre-drilled hole in concrete, comprising: providing at least one pair of identical wedge-shaped members aligned in mirror image relationship with their thinnest tapered edges in juxtaposition separated by a distance Y; adjusting distance Y to be less than the width dimension of the head of the standard bolt to be anchored; spanning distance Y with adhesive tape and removably adhering the adhesive tape to a substantial portion of the top surfaces of each pair of identical wedge-shaped members; positioning each pair of identical wedge-shaped members over a pre-drilled hole with distance Y centered over the hole and with the adhesive surface of the adhesive tape facing the hole; centering the bolt head of the adjusting step over distance Y; forcing the bolt head of the adjusting step into the pre-drilled hole of the positioning step until each pair of identical wedge-shaped members lie flush against the wall of the pre-drilled hole; and urging the bolt head of the adjusting step upwardly to anchor the bolt head in the pre-drilled hole of the positioning step.

Yet another embodiment of the present invention is a method of anchoring a standard bolt nut within a pre-drilled hole in concrete, comprising: providing at least one pair of identical wedge-shaped members aligned in mirror image relationship with their thinnest tapered edges in juxtaposition separated by a distance Y; adjusting distance Y to be less than the width dimension of the bolt nut to be anchored; spanning distance Y with adhesive tape and removably adhering the adhesive tape to a substantial portion of the top surfaces of each pair of identical wedge-shaped members; positioning each pair of identical wedge-shaped members over a pre-drilled hole with distance Y centered over the hole and with the adhesive surface of the adhesive tape facing the hole; centering over distance Y the bolt nut of the adjusting step with a standard bolt attached; forcing the bolt nut of the adjusting step into the pre-drilled hole of the positioning step until each pair of identical wedge-shaped members lie flush against the wall of the pre-drilled hole; and urging the bolt nut of the adjusting step upwardly to anchor the bolt nut in the pre-drilled hole of the positioning step.

It is an object of the present invention to provide a concrete anchoring device that is inexpensive, and potentially recoverable, and which also provides adjustability to accommodate a range of pre-drilled concrete hole diameters and anchor sizes, using commonly available bolts and nuts.

DESCRIPTION OF THE PREFERRED EMBODIMENTS

Figure 1:
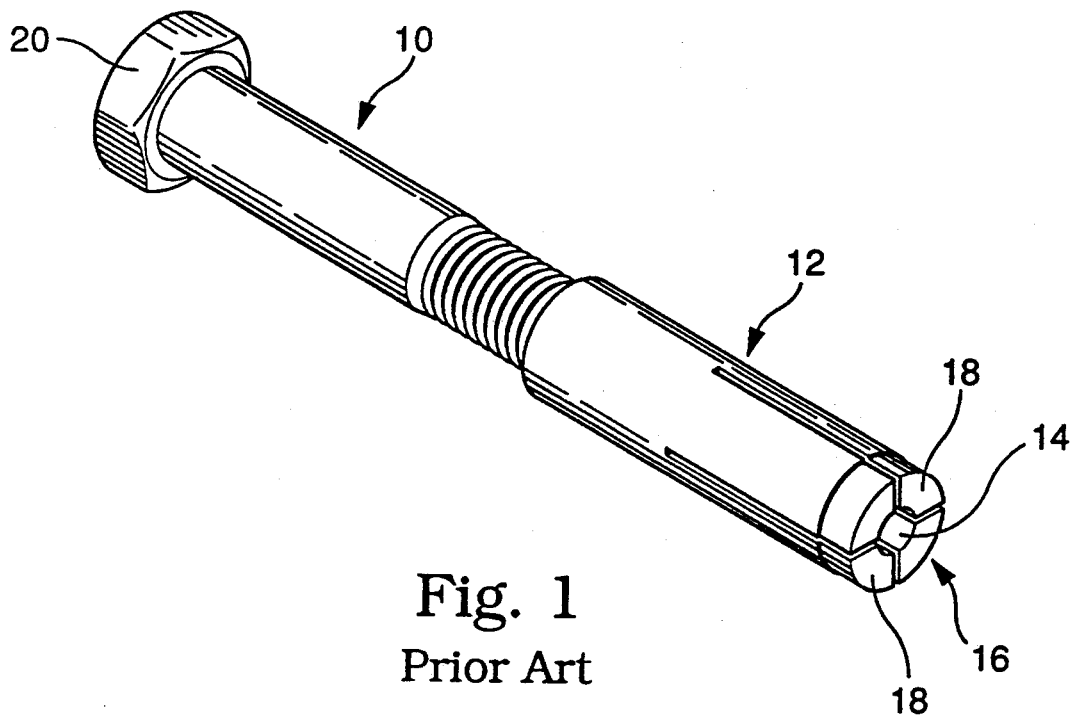
FIG. 1 is a perspective view of a prior art concrete anchor device.

For the purposes of promoting an understanding of the principles of the invention, reference will now be made to the embodiments illustrated in the drawings and specific language will be used to describe the same. It will nevertheless be understood that no limitation of the scope of the invention is intended thereby, such alterations and further modifications in the illustrated device, and such further applications of the principles of the invention as illustrated in the drawings being contemplated as would normally occur to one skilled in the art to which the invention relates.

Figure 3:
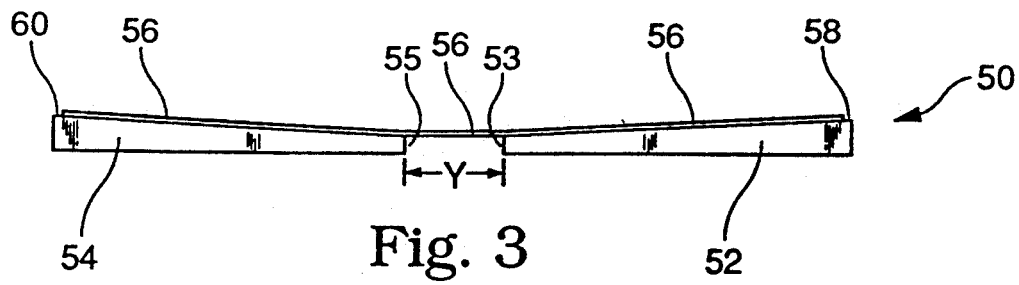
FIG. 3 is a front elevational view of one embodiment of the concrete anchor of the present invention.
Figure 4:
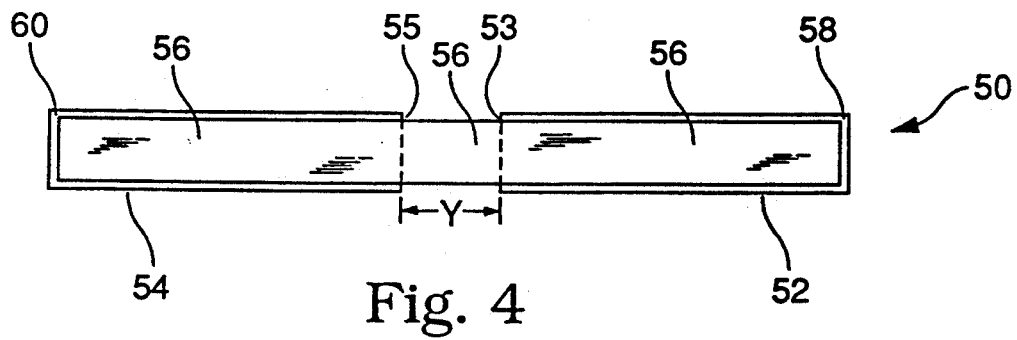
FIG. 4 is a top plan view of the concrete anchor of FIG. 3.

Referring now to the drawings, there is illustrated in FIGS. 3 and 4 a preferred embodiment of the concrete anchor 50 of the present invention. Concrete anchor 50 comprises a pair of identical wedge-shaped members 52 and 54 that are aligned in mirror image relationship with their thinnest tapered edges 53 and 55, respectively, in juxtaposition separated by a distance Y. As will be discussed below, distance Y is selected to correspond to the bolt size to be anchored by concrete anchor 50 in a pre-drilled concrete hole 62. Wedge-shaped members 52 and 54 are held in this described and illustrated position in the preferred embodiment by a single piece of cellophane adhesive tape 56 that spans distance Y and contacts a substantial portion of the top surfaces 58 and 60 of wedge-shape members 52 and 54.

Figure 5:
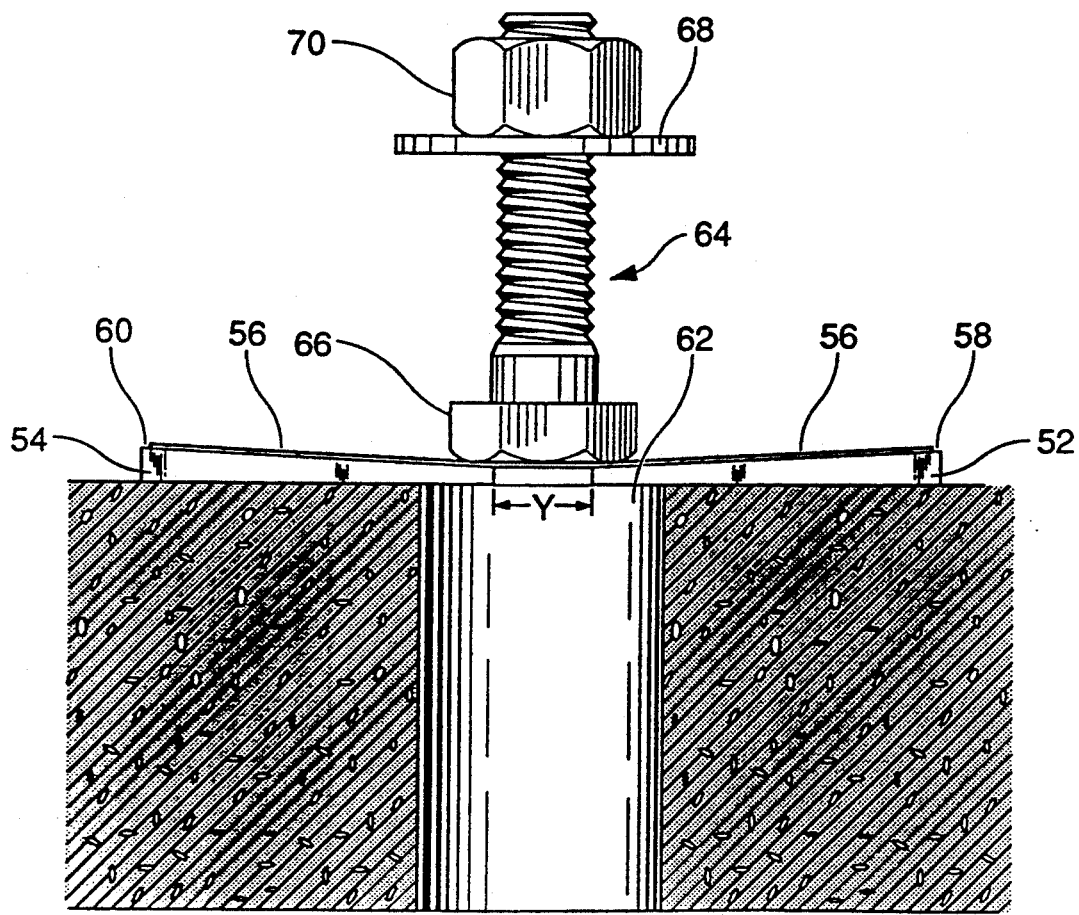
FIGS. 5-7 are partially cross-sectioned views of the concrete anchor of FIG. 3 being utilized in one embodiment of the method of the present invention to provide an anchor for the illustrated bolt, washer and nut within a pre-drilled concrete hole.
Figure 6:
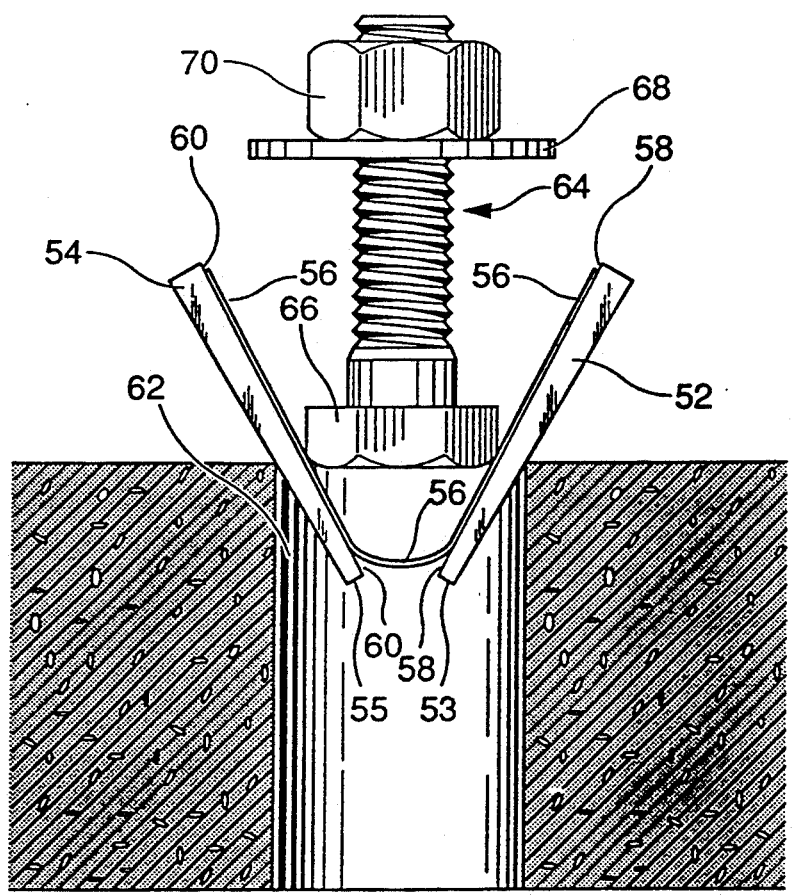
Figure 7:
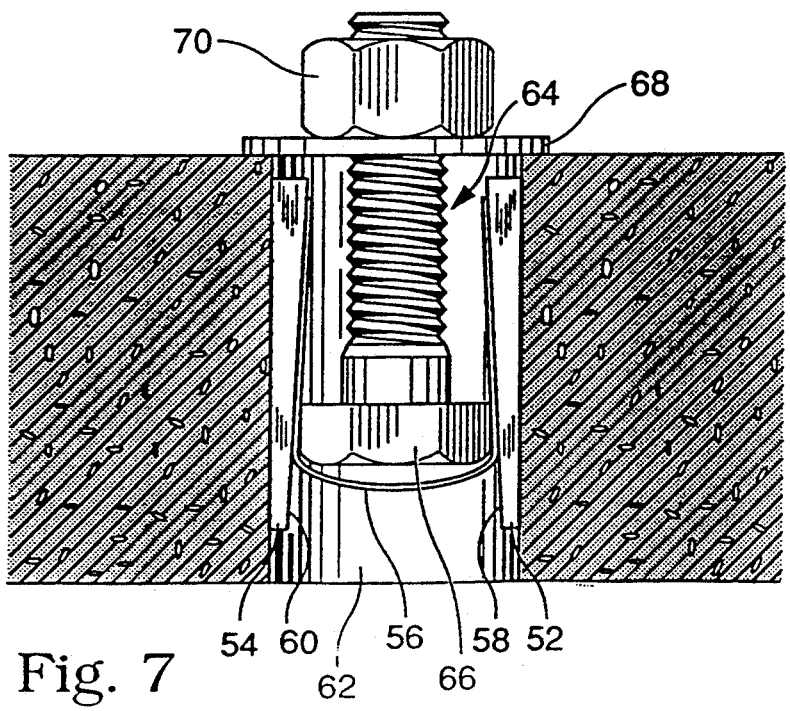

Referring now to FIGS. 5-7, there is illustrated the preferred method of utilizing the concrete anchor 50 of the preferred embodiment. A pre-drilled hole 62, of predetermined diameter and depth, is provided in concrete at a location selected for anchoring a standard bolt 64 having an octagonal head 66. For anchoring purposes, bolt 64 is provided with a standard flat washer 68 having an outer diameter greater than the diameter of pre-drilled hole 62, and a nut 70. Referring to FIG. 5, concrete anchor 50 is placed across the diameter of pre-drilled hole 62. Distance Y is selected to be some dimension less than the width of bolt head 66 yet large enough to allow placement of anchor 50 within pre-drilled hole 62 in the manner to be described below.

Referring again to FIG. 5, in the embodiment illustrated, bolt 64 is positioned over the pre-drilled hole with bolt head 66 against cellophane adhesive tape 56. As described above, because distance Y has been selected to be less than the width of bolt head 66, bolt head 66 will also overlie a portion of the top surfaces 58 and 60 of wedge-shaped members 52 and 54 closest to their thinnest tapered edges. Referring now to FIG. 6, as bolt 64 is pushed downwardly into pre-drilled hole 62, the thinnest tapered edges 53 and 55 of wedge-shaped members 58 an 60 will pivot into pre-drilled hole 62, about the upper rim of pre-drilled hole 62, under the influence of cellophane adhesive tape 56. The pivotal shear forces brought to bear upon cellophane adhesive tape 56 as bolt head 66 is forced downwardly into pre-drilled hole 62 will cause cellophane adhesive tape 56 to be controllably pulled away from the top surfaces 58 and 60 of wedge-shaped members 52 and 54 closest to their thinnest tapered edges 53 and 55. Meanwhile, the frictional forces between bolt head 66 and the cellophane adhesive tape 56 still adhered to the top surfaces 58 and 60 of wedge-shaped members 52 and 54 prevent the wedge-shaped members 52 and 54 from prematurely sliding into pre-drilled hole 62.

Referring now to FIG. 7, when bolt head 66 has been forced into pre-drilled hole 62 a sufficient distance, gravity in cooperation with the shear forces upon the cellophane adhesive tape still adhered to the top surfaces 58 and 60 of wedge-shaped members 52 and 54 and the increasing taper of these members above bolt head 66 within the pre-drilled hole will cause wedge-shaped members 52 and 54 to fall into pre-drilled hole 62 and into a vertically oriented position, flush with the walls of pre-drilled hole 62, as illustrated. Because wedge-shaped members 52 and 54 were pivoted into pre-drilled hole 62 thinnest-tapered-edge first, the increasing taper of wedge-shaped members 52 and 54 above bolt head 66 will not only prevent wedge-shaped members 52 and 54 from falling further into pre-drilled hole 62, but the frictional forces between the surfaces of wedge-shaped members 52 and 54 against the wall of pre-drilled hole 62 will also prevent bolt head 66 from being pulled out of pre-drilled hole 62. Therefore, as nut 70 is tightened against flat washer 68, resting against the concrete surface surrounding pre-drilled hole 62, bolt head 66 will be anchored in place by concrete anchor 50 of the preferred embodiment.

Figure 8:
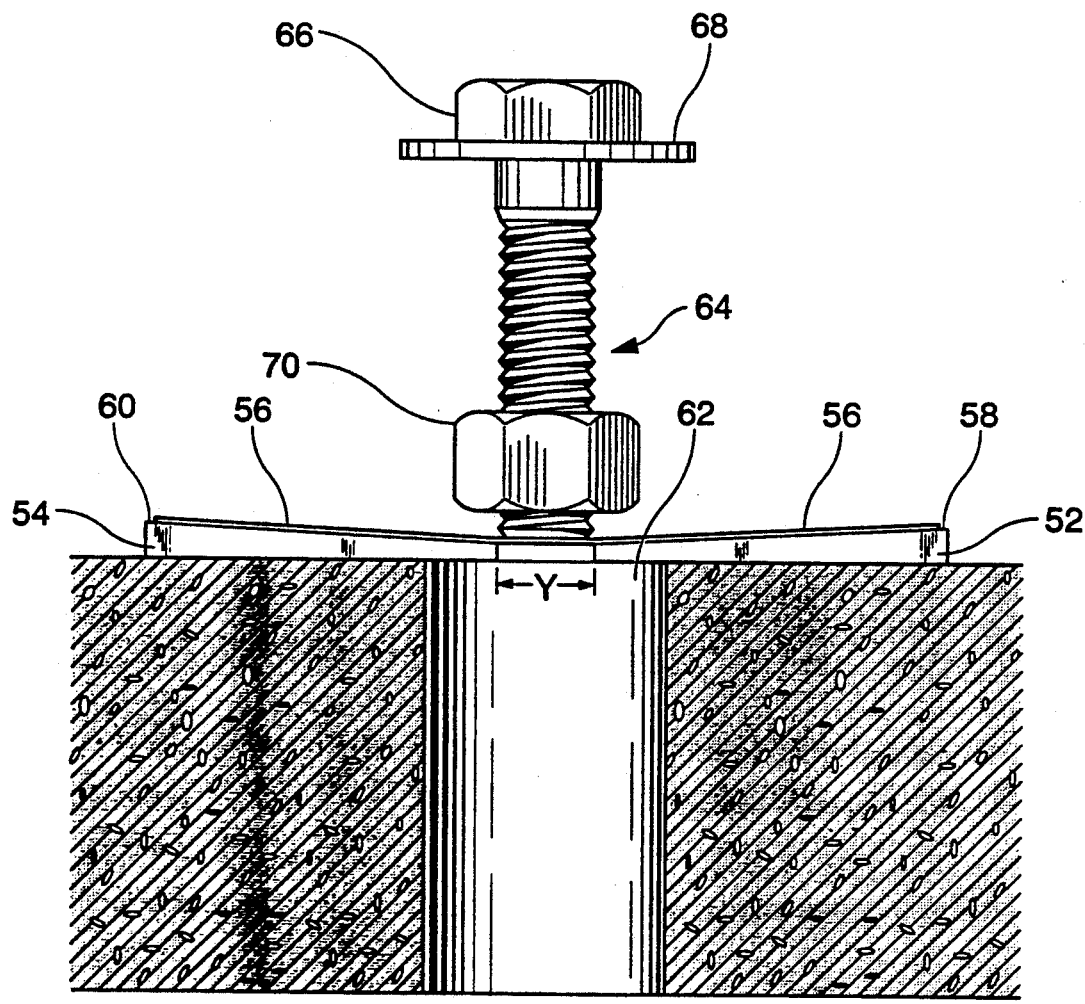
FIGS. 8-11 are partially cross-section views of the concrete anchor of FIG. 3 being utilized in another embodiment of the method of the present invention to provide an anchor for the illustrated nut, washer and bolt within a pre-drilled concrete hole, and the removal of the same for reuse.
Figure 9:
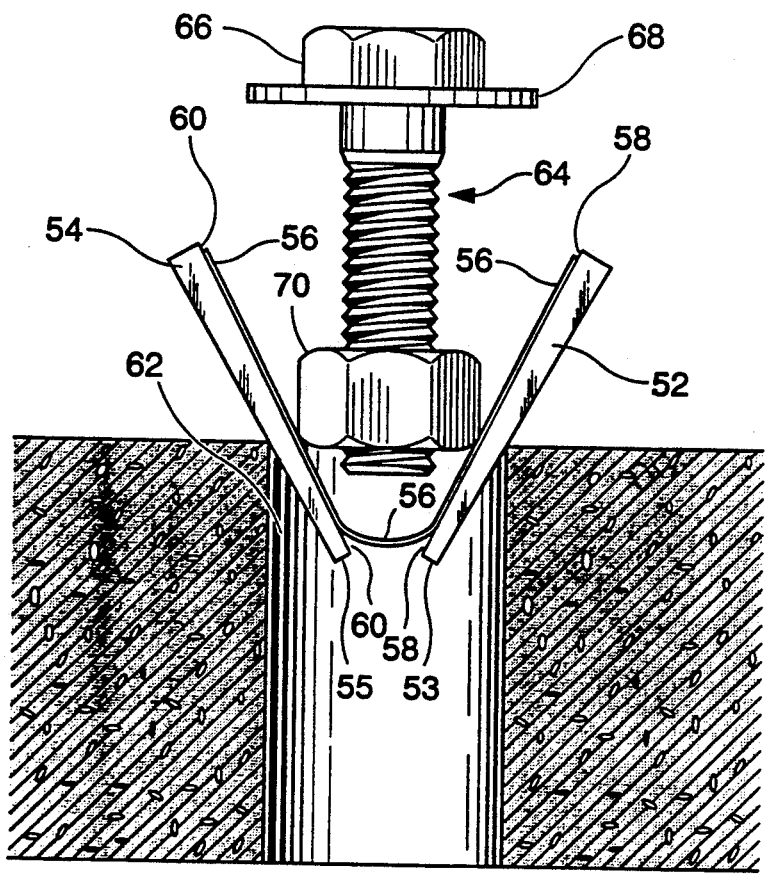
Figure 10:
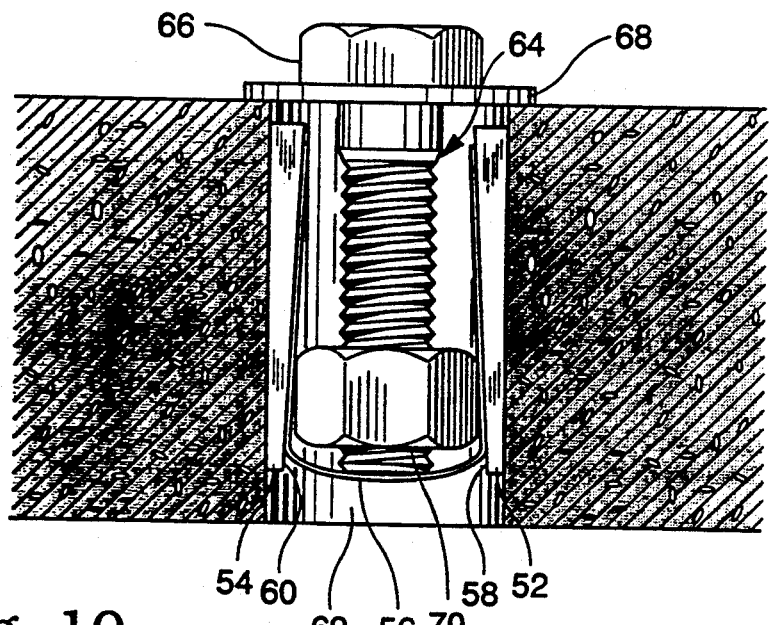
Figure 11:
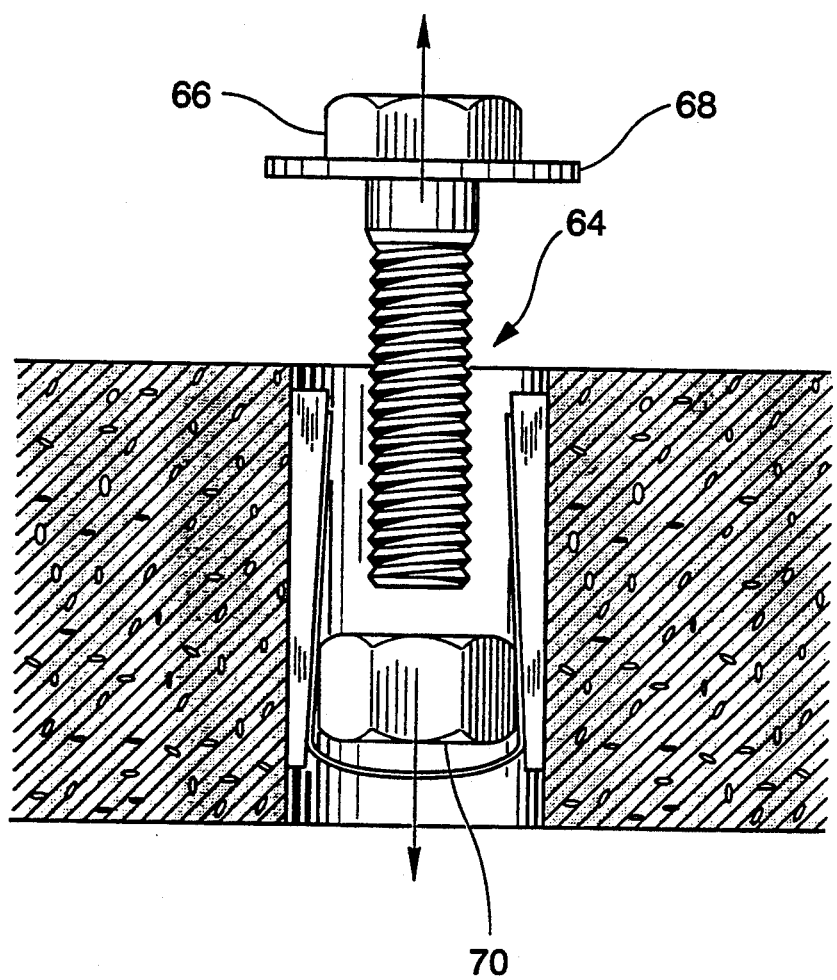

As described, almost any conventional bolt 64 may be anchored with the concrete anchor 50 of the present invention. In addition, rather than introduce bolt 64 into the pre-drilled bolt 62 bolt head 66 first, the bolt 64, flat washer 68 and nut 70 assembly illustrated in FIGS. 5-7 can be inverted and introduced into pre-drilled hole 62 with the nut 70, first, as illustrated in FIGS. 8-10. In this application, nut 70 would be anchored in place in the same fashion as was bolt head 66, in the description, above. In this application, however, the wedge-shaped members 52 and 54 could be recovered after the anchor had served its purpose. Referring to FIG. 11, bolt 64 would be threadingly removed from nut 70, and nut 70 could then be physically driven downward further into pre-drilled hole 62 by breaking through cellophane adhesive tape 56. Doing so would free wedge-shaped members 52 and 54, and nut 70, and they could be removed from the pre-drilled hole 62 for reuse. Simply re-applying cellophane adhesive tape as described above would ready the wedge-shaped members 52 and 54 to serve as the concrete anchor 50 of FIGS. 3 and 4.

Figure 2:
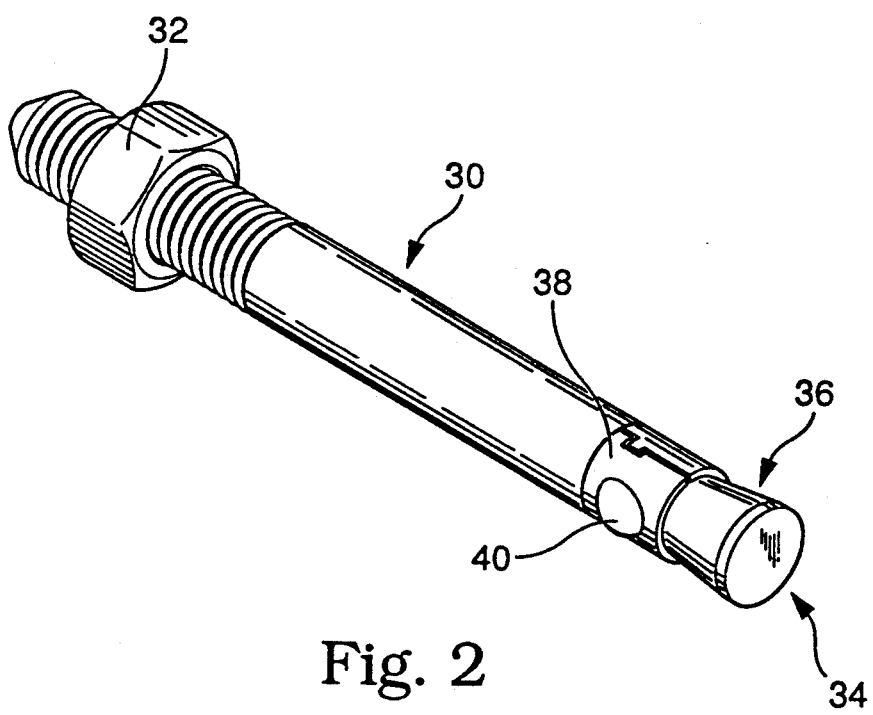
FIG. 2 is a perspective view of another prior art concrete anchor device.

As will be appreciated by those of ordinary skill in this art, the size and depth of pre-drilled hole 62 will be determined by the size of bolt 64 to be anchored therein, which will determine the appropriate overall dimensions and degrees of taper of the wedge-shaped members 52 and 54, and the distance Y, as described above. It will be appreciated that the depth of pre-drilled hole 62 will be oversized, as is customary when using anchoring devices of the prior art (i.e., FIGS. 1 and 2). Also, for very large diameter pre-drilled holes 62, it has been found to be advantageous to use two or more concrete anchors 50 spaced evenly about the circumference of the opening of pre-drilled hole 62. In all other respects the function of a plurality of concrete anchors 50 is the same as for a single concrete anchor 50, as described and illustrated.

In the preferred embodiments to date, wedge-shaped members 52 and 54 have been fashioned from steel, but any sufficiently strong material could be used in place of steel. Also, as described, cellophane adhesive tape as been the preferred material for releasably positioning wedge-shaped members 52 and 54 as described and illustrated. However, any other similar material that would function similarly would also be useful in place of cellophane adhesive tape.

The concrete anchor 50 and method described and illustrated works best on flat, stationary surfaces. The concrete anchor 50 and method described and illustrated could be utilized in overhead applications or in applications involving vibration, as well, if provisions were made to epoxy, or otherwise affix wedge-shaped members 52 and 54 into the position illustrated in FIG. 7.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of anchoring a standard bolt head within a pre-drilled hole in concrete, comprising:
    providing at least one pair of identical wedge-shaped members aligned in mirror image relationship with their thinnest tapered edges in juxtaposition separated by a distance Y;
    adjusting distance Y to be less than the width dimension of the head of the standard bolt to be anchored;
    spanning distance Y with adhesive tape and removably adhering the adhesive tape to a substantial portion of the top surfaces of each said pair of identical wedge-shaped members;
    positioning each said pair of identical wedge-shaped members over a pre-drilled hole with distance Y centered over the hole and with the adhesive surface of said adhesive tape facing the hole;
    centering the bolt head of said adjusting step over distance Y;
    forcing the bolt head of said adjusting step into the pre-drilled hole of said positioning step until each said pair of identical wedge-shaped members lie flush against the wall of the pre-drilled hole; and
    urging the bolt head of said adjusting step upwardly to anchor the bolt head in the pre-drilled hole of said positioning step.

2. A method of anchoring a standard bolt nut within a pre-drilled hole in concrete, comprising:
    providing at least one pair of identical wedge-shaped members aligned in mirror image relationship with their thinnest tapered edges in juxtaposition separated by a distance Y;
    adjusting distance Y to be less than the width dimension of the bolt nut to be anchored;
    spanning distance Y with adhesive tape and removably adhering the adhesive tape to a substantial portion of the top surfaces of each said pair of identical wedge-shaped members;
    positioning each said pair of identical wedge-shaped members over a pre-drilled hole with distance Y centered over the hole and with the adhesive surface of said adhesive tape facing the hole;
    centering over distance Y the bolt nut of said adjusting step with a standard bolt attached;
    forcing the bolt nut of said adjusting step into the pre-drilled hole of said positioning step until each said pair of identical wedge-shaped members lie flush against the wall of the pre-drilled hole; and
    urging the bolt nut of said adjusting step upwardly to anchor the bolt nut in the pre-drilled hole of said positioning step.

3. The method of claim 2 and further comprising:
    driving the bolt nut of said adjusting step downwardly in the pre-drilled hole of said positioning step to free the bolt nut from its anchoring relationship with each said pair of identical wedge-shaped members; and
    recovering each said pair of identical wedge-shaped members for reuse.

* * * * *